United States Patent [19]

Ishiguro

[11] Patent Number: 4,609,275

[45] Date of Patent: Sep. 2, 1986

[54] EXPOSURE CONTROL UNIT

[75] Inventor: Yasuo Ishiguro, Tokyo, Japan

[73] Assignee: Copal Company Limited, Tokyo, Japan

[21] Appl. No.: 774,228

[22] Filed: Sep. 9, 1985

[30] Foreign Application Priority Data

Sep. 29, 1984 [JP] Japan .................................. 59-204644

[51] Int. Cl.$^4$ ................................................ G03B 7/00
[52] U.S. Cl. ...................................... 354/435; 354/453
[58] Field of Search ............. 354/435, 453, 457, 227.1, 354/230, 234.1, 271.1

[56] References Cited

U.S. PATENT DOCUMENTS

| | | | |
|---|---|---|---|
| 3,476,029 | 11/1969 | Schreckendgust | 354/227.1 |
| 3,518,930 | 7/1970 | Thieme et al. | 354/453 |
| 3,526,176 | 9/1970 | Hackenberg et al. | 354/453 |
| 3,986,022 | 10/1976 | Hyatt | 354/227.1 X |

Primary Examiner—William B. Perkey

Attorney, Agent, or Firm—Wenderoth, Lind & Ponack

[57] ABSTRACT

An exposure control unit including an element having electrostrictive properties and a fixed end and a deformation quantity of which is determined in accordance with a voltage applied thereto drives a programming shutter provided with shutter blades having the function of the diaphragm by a driving source composed of the deformation produced at a free end of the electrostrictive element when the voltage is applied to the element. The shutter blades having the function of the diaphragm are opened by the deformation produced at the free end of the electrostrictive element in accordance with the voltage applied to the element and the voltage is increased with the lapse of time in interlocked relationship with the opening operation of the shutter blades so that the electrostrictive element is gradually deformed and the shutter blades are also gradually opened. The electrostrictive element is then short-circuited at a time when a proper exposure is obtained so that the exposure operation is immediately terminated.

4 Claims, 5 Drawing Figures

EXPOSURE CONTROL UNIT

BACKGROUND OF THE INVENTION

The present invention relates to an exposure control unit including an element having electrostrictive properties and a fixed end and a deformation quantity of which is determined in accordance with a voltage applied thereto, and more particularly, to such an exposure control unit which drives a programming shutter provided with shutter blades having the function of the diaphragm by a driving source composed of the deformation produced at a free end of the electrostrictive element when the voltage is applied to the element.

In an ideal automatic exposure control for use in the programming shutter using the shutter blades having the function of the diaphragm, the shutter blades are opened concurrently with a shutter release operation so that the aperture thereof is gradually increased approximately linearly and the shutter blades are immediately closed at a time when a proper exposure is obtained.

In various programming shutters known heretofore, a sufficiently energized spring is immediately released in interlocked relationship with the depression of the shutter button so that the shutter blades are opened. In order to gradually open or increase the aperture of the shutter blades approximately linearly, a delay unit is provided in an opening mechanism for the shutter blades, or the moment of inertia of members of the opening mechanism including the shutter blades is sufficiently increased.

In other words, in the conventional various programming shutter, in order to obtain an ideal opening characteristic, a structure, an arrangement and a weight distribution of the opening mechanism or the members thereof including the shutter blades are very important factors. Accordingly, it is very difficult to design the ideal structure.

As described above, since the structure, the arrangement and the weight distribution of the opening mechanism or the members thereof are very important factors in order to determine the opening characteristic, the opening characteristic may be varied greatly due to variation of temperature or positional change of a camera.

Further, it is pointed out that the response of the shutter is deteriotated upon closure of the shutter and the exposure error is easily caused since it is required to increase the moment of inertia of the members of the opening mechanism including the shutter blades.

U.S. Pat. No. 3,518,930, which is a preceding patent relevant to the present invention, discloses that the shutter blades or the diaphragm blades are driven by the deformation produced in an elecrostrictive element or a magnetostrictive element.

The preceding U.S. patent is identical with the present invention in that when a voltage is applied to the electrostrictive element having a fixed end, the shutter blades or the diaphragm blades are driven by the deformation produced in a free end of the element. The control operation in the U.S. patent is achieved so that the application of a voltage corresponding to the brightness of a subject to be photographed to the electrostrictive element causes the aperture of the diaphragm to correspond to the brightness of the subject, or the application of a pulse voltage having an amplitude and a pulse width determined correspondingly to the brightness of the subject to the electrostrictive element causes an exposure quantity to correspond to the brightness of the subject. However, the U.S. patent does not intend or suggest that the application of a voltage increasing with the lapse of time to the electrostrictive element causes the free end of the element to be deformed gradually so that an approximately linear opening characteristic of the programming shutter is obtained in the same manner as in the present invention.

SUMMARY OF THE INVENTION

The present invention has been made in view of the above described present state, and an object of the present invention is to provide a novel exposure control unit having a simple structure, a stable ideal opening characteristic regardless of variation of temperature and positional change of a camera and an excellent response upon closure of the shutter.

More particularly, the exposure control unit of the present invention is applied to a programming shutter including shutter blades having the function of diaphragm blades and comprises an electrostrictive element having a fixed end and a free end which is deformed correspondingly to an applied voltage, an interlock mechanism associated with the free end of the element for determining an opening quantity of the shutter blades in accordance with a deformation quantity produced at the free end of the element correspondingly to the voltage applied to the element, means for supplying the element with a voltage increasing with the lapse of time in interlocked relationship with a photographing operation and means for short-circuiting between electrodes of the element at a time when a proper exposure is obtained.

In other words, in the exposure control unit of the present invention, since the opening quantity of the shutter blades is determined correspondingly to the deformation produced at the free end of the electrostrictive element when the voltage is applied to the element and the element is supplied with the voltage increasing with the lapse of time, it is not required to consider the structure and the arrangement of the mechanical members or the weight distribution thereof in order to obtain the ideal and approximately linearly opening characteristic, and the difficulty of designing the mechanical members can be solved.

In the exposure control unit of the present invention, since the opening characteristic of the shutter blades is controlled by the applied voltage to the electrostrictive element and the weight distribution of the members of the opening mechanism does not directly concern the opening characteristic of the shutter blades, it is solved that the opening characteristic is varied due to the positional change of the camera and the variation of temperature.

Further, in the exposure control unit of the present invention, it is not necessary to increase the weight of inertia of the members of the opening mechanism including the shutter blades in order to obtain the ideal opening characteristic, and since both the electrodes of the electrostrictive element are short-circuited to close the shutter blades the response of the shutter blades upon closure of the blades can be improved and an exact exposure control can be attained.

DETAILED DESCRIPTION OF THE PREFERRED EMBODIMENTS

An embodiment of the present invention will now be described in detail with reference to the drawings.

Figure 1:
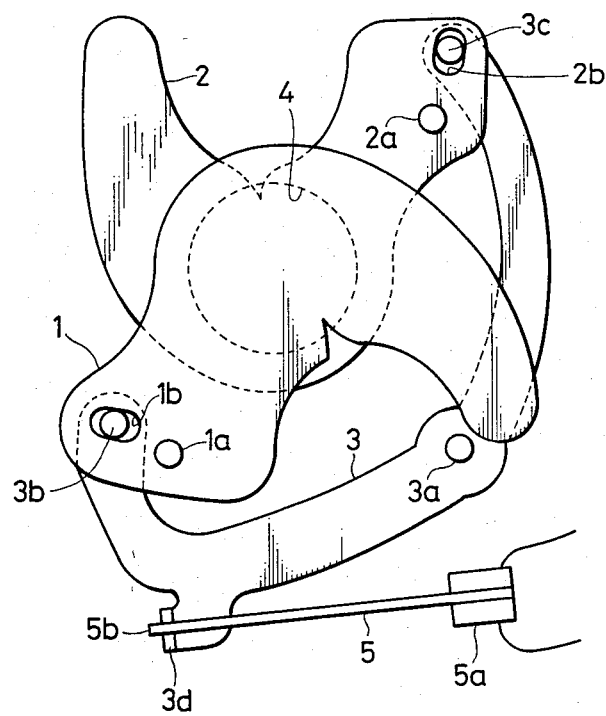
FIG. 1 illustrates a mechanism according to an embodiment of the present invention.
Figure 2:
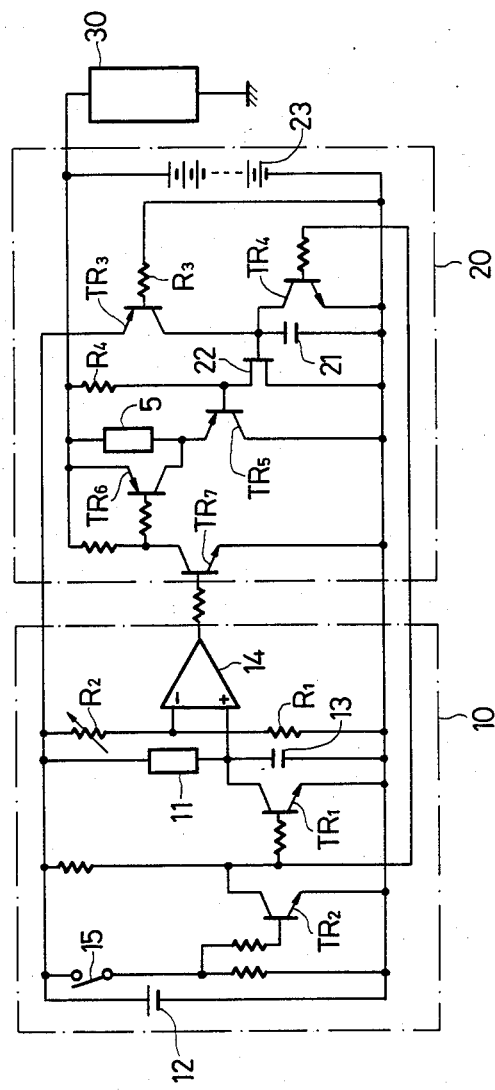
FIG. 2 is a circuit diagram for controlling the mechanism of FIG. 1.

FIG. 1 illustrates shutter blades having the function of the diaphragm blades and a drive mechanism thereof, and FIG. 2 shows a control circuit.

In the embodiment shown in FIGS. 1 and 2, it is assumed that a light receiving element or a photoelectric transducer element utilizes, by way of example, cadmium sulfide (hereinafter referred to as CdS) which is a photoconductive cell.

In FIG. 1, numerals 1 and 2 denote shutter blades having the function of the diaphragm which are pivotally mounted on axes 1a and 2a, respectively, so that the shutter blades are rotated around the axes 1a and 2a, respectively. Numeral 3 denotes an opening and closing lever of the shutter blades 1 and 2 for swinging the blades 1 and 2.

The opening and closing lever 3 is swingably mounted on an axis 3a and pins 3b and 3c are fixedly mounted on left and right ends of the lever 3. The pin 3b is fitted into an elongated groove 1b formed in the blade 1 and the pin 3c is fitted into an elongated groove 2b formed in the blade 2.

Accordingly, in the state of the shutter blades shown in FIG. 1, when the lever 3 is swung counter-clockwise aroung the axis 3a by means of any mechanism, the pin 3b angularly moves the shutter blade 1 counter-clockwise around the axis 1a while the pin 3b is fitted into the elongated groove 1b, and the pin 3c angularly moves the blade 2 counter-clockwise around the axis 2a while the pin 3c is fitted into the groove 2b so that an aperture 4 is gradually opened.

Further, in the state with the aperture opened as described above, when the lever 3 is swung clockwise around the axis 3a by means of any mechanism, the pin 3b angularly moves the blades 1 clockwise around the axis 1a while the pin 3b is fitted into the groove 1b, and the pin 3c angularly moves the blade 2 clockwise around the axis 2a while the pin 3c is fitted into the groove 2b so that the aperture 4 is closed by the shutter blades 1 and 2.

In the present invention, an electrostrictive element 5 produces a drive force for swinging the opening and closing lever 3.

More particularly, the electrostrictive element 5 in the present embodiment has a fixed end 5a which is fixedly mounted on a camera body and a free end 5b which is held by a retaining portion 3d formed to protrude from the lever 3.

Accordingly, when a voltage is applied between electrodes of the electrostrictive element 5 so that the free end 5b of the element 5 is deformed downward in FIG. 1, the opening and closing lever 3 can be angularly moved counter-clockwise. In the deformed state of the element 5 as described above, when the electrodes of the element 5 are short-circuited, the element 5 discharges stored charges to return to its initial state and hence the lever 3 is angularly moved clockwise.

Description will now be made to a structure and operation of the electrostrictive element 5. The element 5 has a laminated structure composed of two layers of piezo-electric ceramic plates and electrodes formed of a conductive film such as metal, one electrode being interposed between both the ceramic plates, the other being disposed outside of the ceramic plates. When a voltage is applied between both the ceramic plates so that each of the ceramic plates exhibits the opposite electrostrictive characteristic, charges are stored between the electrodes in the same manner as a so-called parallel-plate condenser in which the piezo-electric ceramic plates function as a dielectric. The electrostrictive element 5 possesses the property that the element is deformed correspondingly to a potential difference between the electrodes. Even after the application of the voltage is stopped, the above deformed state is maintained since the potential difference is continuously kept by the stored charges. When both the electrodes isolated from each other are short-circuited, the charges are discharged and the element is returned from the deformed state to the initial state.

The deformation characteristic of the electrostrictive element is expressed by the following equation (1):

$$\text{Deformation quantity} = 3l^2 Vd/4Th^{2\ tm} \quad (1)$$

where l is a length of the element, V is a drive voltage, d is an electrostrictive constant and Th is a thickness of the element.

If $3l^2d/4Th^2 = K$ is defined in the equation (1), the equation (1) is converted into the following equation (2) and it can be understood that the deformation quantity is directly proportional to the applied voltage.

$$\text{Deformation quantity} = KV \quad (2)$$

In the present invention, the applied voltage to the electrostrictive element 5 is increased concurrently with the shutter release so that the deformation quantity of the element 5 is gradually increased and the aperture 4 by the shutter blades 1 and 2 is also gradually increased. When a proper exposure quantity is obtained, both the electrodes of the element are short-circuited to return the element 5 to the intial state so that the aperture 4 is immediately closed.

A circuit example for charging and discharging the electrostrictive element 5 as described above will now be described with reference to FIG. 2.

In FIG. 2, numeral 10 denotes an exposure control circuit and numeral 20 denotes a control circuit for the electrostrictive element 5.

In the circuit shown in FIG. 2, the exposure control circuit 10 utilizes a CdS 11 as an example of a photoconductive element for determining the brightness of a subject or a field to be photographed.

The CdS 11 is connected to a power supply 12 for the exposure control 10 through a series-connected condenser 13 and a time constant formed of the CdS 11 and the condenser 13 is determined correspondingly to the brightness of the subject to be photographed. Accordingly, if it is so designed that the shutter blades 1 and 2 begins to be opened by the deformation of the electrostrictive element 5 produced in interlocked relationship with the shutter release operation as described later and at the same time the condenser 13 is charged through the CdS 11 and when a charge level of the condenser 13 reaches a certain level determined in accordance with a sensitivity of a film or a film speed the shutter blades 1 and 2 are closed, the exposure control in accordance with the brightness of the subject to be photographed can be attained.

Accordingly, in the present embodiment, a transistor $TR_1$ is cut off in interlocked relationship with the shutter release operation so that the condenser 13 begins to be charged. The charge level of the condenser 13 is supplied to a non-inverting input of a comparator 14 and a voltage level determined by a ratio of voltages divided by a resistor $R_1$ and a variable resistor $R_2$ of which a resistance value is changed in accordance with the film sensitivity is supplied to an inverting input of the comparator 14. When the charge level of the condenser 13 reaches an inverting input level of the comparator 14, a shutter closing signal is generated.

The switching operation of the transistor $TR_1$ is controlled by a transistor $TR_2$ which is switched in response to the on-and-off operation of a switch 15 operating in interlocked relationship with the shutter release operation.

The base of the transistor $TR_1$ is connected to the collector output of the transistor $TR_2$ and the base of the transistor $TR_2$ is connected to a ground side terminal of the switch 15.

Accordingly, when the switch 15 is off, a base current is not supplied to the transistor $TR_2$ and the transistor $TR_2$ is cut off. Hence, a base current is supplied to the transistor $TR_1$ and the transistor $TR_1$ is turned on. Consequently, the condenser 13 is short-circuited and is not charged.

On the other hand, when the switch 15 is turned on, since the base current is supplied to the transistor $TR_2$ and the transistor $TR_2$ is turned on, the base of the transistor $TR_1$ is grounded through the transistor $TR_2$ and the transistor $TR_1$ is cut off. Accordingly, the condenser 13 is charged through the CdS 11.

The control circuit 20 of the electrostrictive element 5 in FIG. 2 begins to charge a condenser 21 in interlocked relationship with the shutter release operation. The charged voltage of the condenser 21 is amplified to be applied to the electrode of the electrostrictive element 5 so that the element 5 is gradually deformed. Both the electrodes of the element 5 are short-circuited in response to the shutter closing signal generated from the comparator 14 when a proper exposure is obtained and the deformation of the element 5 is immediately restored.

More particularly, the base of a transistor $TR_3$ is grounded through a resistor $R_3$ and a constant current is supplied through the transistor $TR_3$ to a parallel circuit composed of the condenser 21 and a transistor $TR_4$.

In an initial state, since the switch 15 is off and the transistor $TR_2$ is cut off, the transistor $TR_4$ is on and the condenser 21 is hence short-circuited through the transistor $TR_4$. When the transistor $TR_2$ is turned on by the shutter release operation and the transistor $TR_4$ is turned off, the condenser 21 begins to be charged by the constant current flowing through the transistor $TR_3$ and a gate voltage level of an FET 22 is increased.

Accordingly, a drain current in accordance with the charge level of the condenser 22 flows from a high voltage power supply 23 for driving the element 5 to a series circuit composed of the FET 22 and the resistor $R_4$ and a voltage drop is produced across the resistor $R_4$. A high voltage corresponding to the voltage drop is applied between both the electrodes of the element 5 through a transistor $TR_5$ and the element 5 is gradually deformed.

Since the electrostrictive element 5 operates equivalently to a capacitance in circuitry, the element 5 holds the once stored charges until discharged and maintains its deformed state. When both the electrodes of the element 5 in this state are short-circuited to discharge the stored charges, the deformed state of the element 5 can be restored immediately.

In the embodiment, a transistor $TR_6$ connected in parallel between both the electrodes of the element 5 is turned on at the timing when a proper exposure is obtained so that the charges stored in the element 5 are immediately discharged.

More particularly, the base of the transistor $TR_6$ is connected to the collector output of a transistor $TR_7$ and the shutter closing signal which is the output of the comparator 14 described above is applied to the base of the transistor $TR_7$.

Accordingly, when the comparator 14 generates the shutter closing signal at the timing when a proper exposure is obtained, the transistor $TR_7$ is turned on and a base current of the transistor $TR_6$ flows. The transistor $TR_6$ is thus turned on and short-circuits between both the electrodes of the element 5 so that the charges stored in the element 5 is discharged immediately.

Operation of the embodiment shown in FIGS. 1 and 2 will now be described.

In the initial state, the shutter blades 1 and 2 and the opening mechanism associated therewith are in the state shown in FIG. 1 and the aperture 4 is closed by the shutter blades 1 and 2. The variable resistor $R_2$ is set to a resistance value corresponding to the film sensitivity in interlocked relationship with a film sensitivity setting mechanism.

In this state, when a photographer presses the shutter button, the switch 15 is turned on and the base current of the transistor $TR_2$ flows to turn on the transistor $TR_2$.

In this manner, when the transistor $TR_2$ is turned on, the transistor $TR_1$ is turned off and the condenser 13 is charged through the CdS 11.

Since the resistance value of the CdS 11 is determined in accordance with the brightness of a subject or a field to be photographed, the condenser 13 is charged by a time constant corresponding to the brightness of the subject.

On the other hand, when the transistor $T_2$ is turned on, the transistor $TR_4$ is also turned off.

Since the constant current is supplied to the parallel circuit of the condenser 21 and the transistor $TR_4$ through the transistor $TR_3$, the condenser 21 begins to be charged and its charge level increases approximately linearly when the the transistor $TR_4$ is turned off in interlocked relationship with the turning on of the switch 15.

Since the gate voltage level of the FET 22 is determined by the charge level of the condenser 21, the drain current flowing through the series circuit of the resistor $R_4$ and the FET 22 increases. The drain current is converted into a voltage as the voltage drop across the resistor $R_4$ and the converted high voltage is applied between both terminals of the electrostrictive element 5 through the transistor $TR_5$. Accordingly, the applied voltage to the element 5 increases approximately linearly as the charge level of the condenser 21 increases.

As described above, since the electrostrictive element 5 is deformed in accordance with the increase of the applied voltage, when the applied voltage to the element 5 increases approximately linearly, the free end 5b of the element 5 is deformed downward in FIG. 1 in accordance with the deformation quantity corresponding to the applied voltage so that the opening and closing lever 3 is angularly moved counter-clockwise around the axis 3a.

In interlocked relationship with the angular movement of the lever 3, the pin 3b angularly moves the shutter blade 1 counter-clockwise around the pin 1a while fitted into the elongated groove 1b, and the pin 3c angularly moves the shutter blade 2 counter-clockwise around the pin 2a while fitted into the elongated groove 2b. Each of the shutter blades 1 and 2 is angularly moved counter-clockwise while the aperture 4 is gradually opened approximately linearly.

Figure 3:
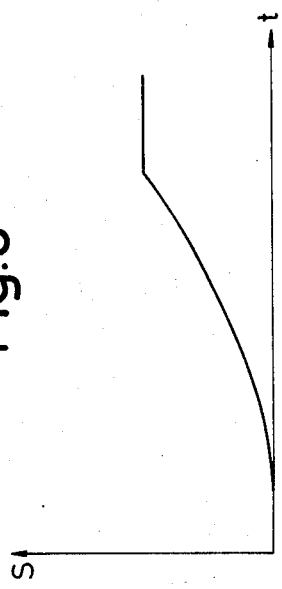
FIG. 3 graphically illustrates an opening characteristic of a program shutter.

FIG. 3 graphically illustrates an example of the relation of the opening time t and the open area S.

On the other hand, as described above, the transistor $TR_1$ is turned off in response to the turning on of the switch 15 and the condenser 13 is charged through the CdS 11. When a proper exposure is obtained, the charge level of the condenser 13 exceeds the inverting input level of the comparator 14 and at the same time the comparator 14 generates the shutter closing signal which supplies the base current to the transistor $TR_7$ and turns on the transistor $TR_7$.

Accordingly, since the base current of the transistor $TR_6$ flows through the transistor $TR_7$, the transistor $TR_6$ is turned on and short-circuits between both the electrodes of the electrostrictive element 5.

The charges stored in the electrostrictive element 5 are immediately discharged through the transistor $TR_6$ and the element 5 is returned from the deformed state to the initial state due to the discharge of the stored charges.

In FIG. 1, when the electrostrictive element 5 is returned to its initial state, the lever 3 is swung clockwise around the axis 3a so that the shutter blades 1 and 2 are angularly moved clockwise in interlocked relationship with the swinging operation of the lever 3 and the aperture 4 is closed. In the present invention, since the weight of inertia of the mechanical members including blades can be minimized, the response of the mechanical members upon closure of the shutter is extremely excellent and an exact exposure control can be attained.

Figure 4:
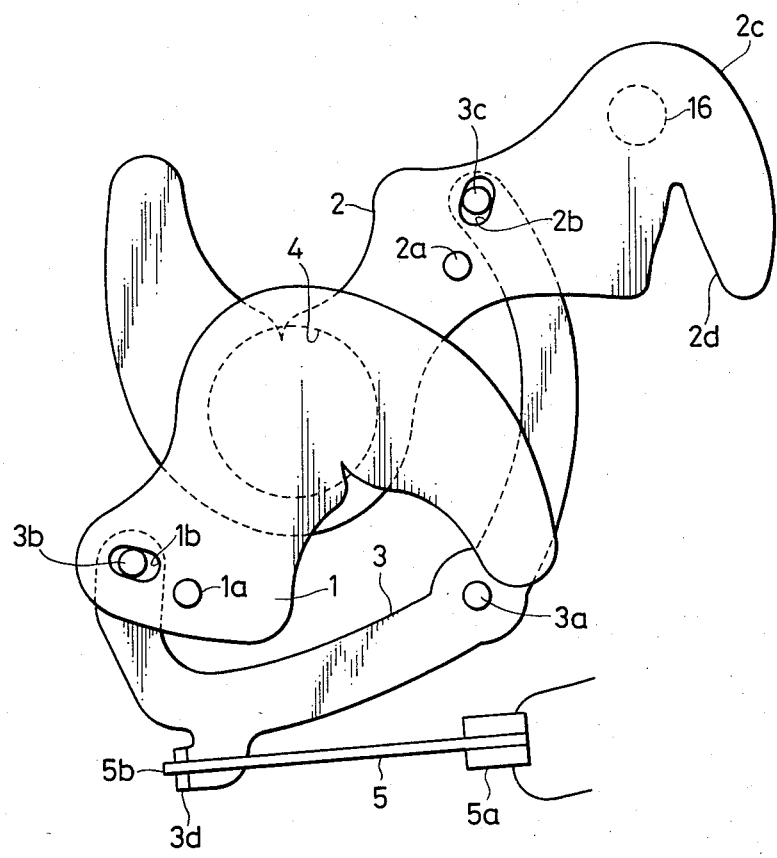
FIG. 4 illustrates a mechanism according to another embodiment of the present invention.

FIG. 4 illustrates shutter blades having the function of the diaphragm and drive mechanisms thereof according to another embodiment of the present invention.

Figure 5:
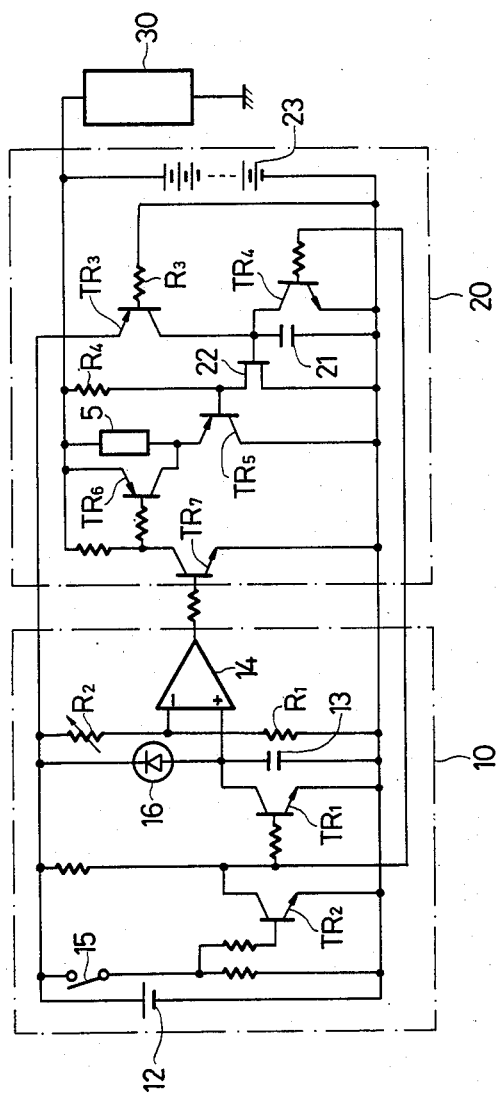
FIG. 5 is a circuit diagram for controlling the mechanism of FIG. 4.

The embodiment shown in FIGS. 4 and 5 shows an example in which a silicon photodiode (hereinafter referred to as SPD) is used as a light receiving element or a photoelectric transducer element.

In the case of the programming shutter provided with the shutter blades having the function of the diaphragm, the integrated value of the exposure quantity is simply proportional to the exposure time after the aperture number is equal to the fully opened aperture number, that is, after the aperture is fully opened. The integrated value of the exposure quantity is not simply proportional to the exposure time in a so-called triangular aperture area before the aperture is fully opened (the triangular aperture area represents an area in which the aperture area S increases with the lapse of the exposure time t in FIG. 3). Accordingly, it is desirable to use a light receiving element or a photoelectric transducer element having a value $\gamma$, for example approximately 0.5 to 0.7, suitable for the aperture characteristic.

The value $\gamma$ is one of numerical values indicating characteristics of a light receiving element. If an inverse number of a resistance value in the case of a photoconductive element or a photocurrent in the case of a photovoltaic element is proportional to the $\gamma$th power of the brightness of the subject to be photographed, the number $\gamma$ corresponds to the value $\gamma$.

In the case of the photoconductive element such as CdS, it is physically and relatively easy to manufacture the element having any value $\gamma$. However, in the case of the photovoltaic element such as SPD, the value $\gamma$ is equal to 1 physically. Accordingly, when the photovoltaic element such as SPD is used, the value $\gamma$ is electrically corrected by a complicated electronic circuit in many cases. However, in the embodiment shown in FIGS. 4 and 5, an amount of light incident to a light receiving element is adjusted to match the opening characteristic of the shutter blades 1 and 2 by means of an auxiliary diaphragm blade 2c integrally formed with the shutter blade 2 so that a complicated correction for the value $\gamma$ is not required.

More particularly, in the embodiment shown in FIG. 4, an end of the shutter blade 2 is extended to form the auxiliary diaphragm blade 2c. The auxiliary diaphragm blade 2c is formed with a V-shaped light receiving groove 2d. An SPD 16 of a light receiving element is disposed in a position where the light receiving groove 2d passes when the auxiliary diaphragm blade 2c is angularly moved counter-clockwise in interlocked relationship with the counter-clockwise movement of the shutter blade 2.

Accordingly, since a light receiving area of the SPD 16 is increased by a mechanism having the auxiliary diaphragm blade 2c as shown in FIG. 4 as the area of the aperture 4 increases, a light receiving quantity of the SPD 16 exactly corresponds to a light receiving quantity of a photosensitive plane even in the so-called triangular aperture area before the aperture 4 is fully opened, and the SPD 16 of the light receiving element having an inherent value $\gamma$ of 1 can be used without the need of correction for the value $\gamma$.

With the mechanism having the auxiliary diaphragm blade 2c as shown in FIG. 4, even when the SPD having a excellent response in a low brightness range is used as a light receiving element, a simple circuit similar to the exposure control circuit for CdS shown in FIG. 2 can be used.

Since the photoconductive element such as CdS has less limitation for the inherent value $\gamma$, if its composition is determined so that the value $\gamma$ is equal to 1, it is needless to say that the embodiment shown in FIGS. 4 and 5 can be applicable.

In the circuit of FIG. 5, like elements to those shown in the circuit of FIG. 2 are given like numerals and description thereof is omitted. Difference therebetween will now be described.

The difference of the circuit shown in FIG. 5 from the circuit of FIG. 2 is that when the voltage is applied to the series intergrating circuit composed of the CdS 11 and condenser 13 in the circuit of FIG. 2, the variation of the charge time of the condenser 13 in accordance with the brightness of the subject to be photographed is utilized so that the exposure time is controlled, while when a voltage in the reverse direction is applied to a series circuit composed of the SPD 16 and the condenser 13 in the circuit of FIG. 5, the condenser 13 is charged by a photocurrent generated by the SPD 16 in accordance with the brightness of the subject. Other circuit configuration is basically identical with the circuit of FIG. 2.

Operation of the embodiment shown in FIGS. 4 and 5 will now be described with simplification of the duplicate operation of the embodiment shown in FIGS. 1 and 2.

When the transistor TR$_4$ is cut off by the turning on of the switch 15, the condenser 21 is charged by the constant current flowing through the transistor TR$_3$.

A voltage drop is generated across the resistor R$_4$ by the drain current of the FET 22 in accordance with the charge level of the condenser 21, so that the voltage applied to the electrostrictive element 5 is gradually increased approximately linearly and the free end of the element 5 is deformed downward.

As described above, when the element 5 is deformed, the shutter blades 1 and 2 is angularly moved counterclockwise to gradually open the aperture 4 and reflected light from the subject is given on the film plane through the aperture 4.

In the present embodiment, since the auxiliary diaphragm blade 2c is also interlocked with the shutter blade 2, the aperture for the SPD 16 is opened by the light receiving groove 2d of the auxiliary diaphragm blade 2c in interlocked relationship with the opening operation of the aperture 4.

Since the transistor TR$_1$ is also cut off by the turning on of the switch 15, when an aperture for the SPD 16 begins to be opened by the light receiving groove 2d, a photocurrent flows through the SPD 16 in accordance with a light receiving area and the brightness of the subject or the field to be photographed and the condenser 13 is charged by the photocurrent. When the charge level of the condenser 13 reaches the inverting input level of the comparator 14, the comparator 14 produces the shutter closing signal. The transistor TR$_6$ short-circuits between both the terminals of the electrostrictive element 5 in response to the shutter closing signal and hence the deformation of the element 5 is immediately restored to close the shutter blades 1 and 2 instantly.

In the circuits of FIGS. 2 and 5, while the power supply 23 for driving the electrostrictive element 5 requires a high voltage of the order of 100 volts, a DC-DC converter for supplying power to a strobo flash circuit 30 can be utilized as the power supply 23 since a camera provided with this kind of programming shutter generally contains the strobo flash circuit 30.

Although the above embodiments have shown examples in which two shutter blades having the function of the diaphragm are driven by the electrostrictive element, it is needless to say that the number of the shutter blades is not limited as far as the present invention is applied to the programming shutter using the shutter blades having the function of the diaphragm.

The exposure control circuit may use various control circuits known heretofore. Further, there may be various modifications for the drive circuit of the electrostrictive element except the above circuit configurations as far as the circuit comprises means capable of applying a voltage increasing with the lapse of the exposure time to the electrostrictive element and means capable of short-circuiting between both terminals of the element at the timing when a proper exposure is obtained.

As described above, according to the present invention, since a voltage increasing with the lapse of time is applied to the electrostrictive element to deform the element and the aperture is opened by the deformation of the element, the aperture mechanism and members thereof can be so simple that the deformation produced in the free end of the element is merely transmitted to the shutter blades.

Accordingly, an ideal opening characteristic can be obtained without the provision of a delay unit in the aperture mechanical members and the increased weight of inertia of the aperture mechanical members.

In the present invention, since the weight distribution of the aperture mechanical members is not an important factor with regard to the determination of the opening characteristic, the opening characteristic does not change depending on the variation of temperature and the positional change of a camera.

Furthermore, in the present invention, since the weight of inertia of the opening mechanism can be minimized while an ideal opening characteristic is obtained, the response upon closure of the shutter and the exposure accuracy can be improved.

The actual control circuit can be composed of, for example, a simple charging circuit, a voltage amplifier circuit and a switching circuit, and the opening characteristic of the shutter blades can be set by adjustment of the charging circuit.

What is claimed is:

1. An exposure control unit for use with a programming shutter including a shutter blade having function of a diaphragm blade, comprising:
    an electrostrictive element having a fixed end and a free end deformed in accordance with an applied voltage;
    interlocking means associated with said free end of said electrostrictive element for determining an opening quantity of the shutter blade in accordance with a deformation quantity produced in said free end of said electrostrictive element in accordance with the applied voltage to the element;
    means for supplying said element with a voltage increasing with passage of time in interlocked relationship with a photographing operation; and
    means for discharging stored charges in said element at a timing when a proper exposure is obtained.

2. An exposure control unit according to claim 1, wherein said means for supplying said element with the voltge comprises a charging circuit to which a constant current is supplied in interlocked relationship with the photographing operation and a voltage amplifier circuit for amplifying the charge level of the charging circuit to determine the applied voltage to said element.

3. An exposure control unit according to claim 1, wherein the applied voltage to said element is obtained from a step-up circuit for a strobo flash.

4. An exposure control circuit according to claim 1, further comprising means for short-circuiting between electrodes of said electrostrictive element at a timing when an integrated value of current flowing through a light receiving element in proportion to a brightness of a subject or a field to be photographed reaches a predetermined level and means for increasing an opening area of said light receiving element in proportion to an opening area of the shutter blade.

* * * * *